United States Patent [19]

Kurihara

[11] Patent Number: 4,544,949
[45] Date of Patent: Oct. 1, 1985

[54] X-RAY DIAGNOSTIC APPARATUS AND METHOD

[75] Inventor: Tetsuro Kurihara, Ootawara, Japan

[73] Assignee: Tokyo Shibaura Denki Kabushiki Kaisha, Kawasaki, Japan

[21] Appl. No.: 472,245

[22] Filed: Mar. 4, 1983

[30] Foreign Application Priority Data

Mar. 5, 1982 [JP] Japan .................. 57-34589

[51] Int. Cl.$^4$ .................. H04N 7/18; A61B 6/02
[52] U.S. Cl. .................. 358/111; 128/654; 364/414; 378/42; 378/99
[58] Field of Search .......... 358/111; 128/653, 654; 378/41, 42, 99, 100; 364/414

[56] References Cited

U.S. PATENT DOCUMENTS

| | | | |
|---|---|---|---|
| 3,076,054 | 1/1963 | Simon | 358/111 |
| 4,204,225 | 5/1982 | Mistretta | 358/111 |
| 4,204,226 | 5/1980 | Mistretta | 358/111 |
| 4,214,267 | 7/1980 | Roese | 358/111 |
| 4,383,328 | 5/1983 | Kurihara | 378/42 |
| 4,425,580 | 1/1984 | Haendle | 358/111 |
| 4,472,737 | 9/1984 | Iwasaki | 358/111 |

FOREIGN PATENT DOCUMENTS

| | | |
|---|---|---|
| 1236821 | 3/1967 | Fed. Rep. of Germany . |
| 2530315 | 1/1976 | Fed. Rep. of Germany . |
| 2943700 | 5/1980 | Fed. Rep. of Germany . |
| 3028149 | 2/1982 | Fed. Rep. of Germany . |

OTHER PUBLICATIONS

*A J R*, 135, pp. 1131–1140, "Computerized Fluoroscopy", Andrew B. Crummy et al., Dec. 1980.

*Primary Examiner*—Howard W. Britton
*Attorney, Agent, or Firm*—Cushman, Darby & Cushman

[57] ABSTRACT

It is desirable in a digital subtraction angiography to realize the stereoscopic X-ray image visualization of a blood vessel by means of an X-ray diagnostic apparatus. In accordance with the invention, the object such as blood vessels is projected by X-rays before and after injection of the X-ray contrast medium at two different projection angles with respect to the object, i.e., right view and left view. So right-viewed X-ray "mask images'" and "subtraction images'" video signals and left-viewed X-ray "mask images'" and "subtraction images'" video signals are separatedly obtained. Then the right-viewed mask image's video signal is combined with the left-viewed one, resulting in one stereoscopic visual TV picture consisting of the desired portions of both the right-viewed image and the left-viewed image on the TV monitor simultaneously. Similar combination processing is carried out in the subtraction images' video signals, so that one can observe stereoscopically the combined subtraction images of the blood vessels on the TV monitor.

7 Claims, 6 Drawing Figures

F I G. 4  DIGITAL PROCESSOR 13

(A) R-VIEWED CAMERA IMAGE
(B) R-VIEWED VIDEO SIGNAL
(C) L-VIEWED CAMERA IMAGE
(D) L-VIEWED VIDEO SIGNAL
(E) 2ND GATE SIGNAL
(F) GATED VIDEO SIGNAL (R)
(G) 1ST GATE SIGNAL
(H) GATED VIDEO SIGNAL (L)
(I) COMBINED VIDEO SIGNAL
(J) SYNC SIGNAL FOR COMBINED VIDEO SIGNAL
(K) COMPLETE COMBINED VIDEO SIGNAL
(L) COMBINED TV PICTURE

X-RAY DIAGNOSTIC APPARATUS AND METHOD

BACKGROUND OF THE INVENTION

I. Field of the Invention

This invention generally relates to an X-ray diagnostic apparatus and method utilizing digital radiography, and more particularly to an X-ray diagnostic apparatus utilizing and method digital subtraction angiography.

II. Description of the Prior Art

The development of X-ray diagnostic apparatus and method utilizing digital subtraction angiography has opened the door to substantial progress in the state of the art of X-ray diagnostic apparatus, especially digital subtraction type angiographic diagnostic apparatus.

That is, this diagnostic apparatus employs the so-called "Digital Radiography" or "Digital Fluoroscopy" technique in which time image subtraction and digital image processing are utilized.

As shown in FIG. 1, when time T0 has elapsed after an X-ray contrast medium for a blood vessel was intravenously injected in an upper arm of an object to be examined, such as a patient, a first X-ray projection is performed by an X-ray TV camera (not shown) to photograph the portions of the patient which are not substantially subject to movement such as cervical, cephalic, spiral and abdominal vessel systems as well as leg, aortal, pulmonary artery and peripheral vessel systems. X-ray television picture signals from the X-ray TV camera are A/D converted, and the resultant digital X-ray television picture signals which indicate mask images which contain no contrast medium, are stored in a first digital memory (not shown). When a time interval (T0+T1) has elapsed after the contrast medium had been injected, a second X-ray projection of the portion of the patient to be examined is performed. Thereafter, X-ray projections are intermittently performed at intervals of, for example, one second and the portion of the patient to be examined is projected by X-ray beams and viewed by the X-ray TV camera while the contrast medium interruptedly flows in the portion X-ray television picture signals are produced by the X-ray TV camera and are A/D converted into the digital X-ray television picture signals which are stored in a second digital memory (not shown). The X-ray television picture signals in the first digital memory are subtracted from the X-ray television picture signals in the second digital memory, thereby obtaining subtraction picture signals of an angiogram or a subtraction image showing the flow of contrast medium within blood vessels. The subtraction picture signals are then D/A converted to obtain analog subtraction picture signals, so that subtraction images shown in FIG. 1 are displayed on a CRT monitor. Otherwise, these subtraction images are photographed by a multi-format camera.

Digital radiography has received a great deal of attention since it can be applied to a conventional contrast medium injection method for injecting the contrast medium in an artery using a catheter, and to a vein injection method without using an artery catheter, thus realizing safe, fast and accurate diagnosis.

However, since digital radiography is fundamentally performed by an examination of blood vessels using a contrast medium, and the blood vessels are three-dimensionally distributed, a subtraction image obtained by a unidirectional X-ray projection can only be observed as a two-dimensional image of the three-dimensional object. Consequently, it is very difficult for a doctor to investigate the two-dimensional image as a three-dimensional image. After the first unidirectional X-ray projection is completed, the contrast medium is injected again in the patient. The portion of the patient to be examined is X-ray projected from a different direction from that in the first unidirectional X-ray projection by changing the positioning of the patient or by rotating an X-ray tube and an image intensifier (not shown) with respect to the patient, thereby obtaining a plurality of subtraction images which show the same portion from different angles. The doctor can thus investigate the portion of the patient to be examined by overlaying two different subtraction images in a three-dimensional manner. However, the contrast medium must be injected in the patient every time an X-ray projection is performed from a new angle, so that a total quantity of the injected contrast medium becomes large. As a result, it is difficult to ensure the safety of the patient.

SUMMARY OF THE INVENTION

The present invention has been made in consideration of the above situation, and a primary object of the present invention is to provide an X-ray diagnostic apparatus and method which allows stereoscopic visualization of angiograms while injecting a contrast medium only once.

A second object of the present invention is to provide an X-ray diagnostic apparatus and method which allows an easy investigation of not only mask images but also subtraction images while ensuring safety of a patient.

In accordance with the invention, X-ray diagnostic apparatus and method are provided in which:

X-ray radiation is alternately projected toward the object at two different projection angles with respect to the object a first analog video signal is produced from a first X-ray image taken before and after injection of the contrast medium at the first projection angle, and a second analog video signal is produced from a second X-ray image taken before and after injection of the contrast medium at the second projection angle; first and second subtraction images' analog video signals are separately produced by performing a digital subtraction between said first and second analog video signals obtained before injection of the contrast medium and said first and second analog video signals obtained after injection of the contrast medium, respectively; the first subtraction image's analog video signal is combined with the second subtraction image's analog video signal, whereby both the first subtraction image and the second subtraction image are stereoscopically viewed at the same instant on a TV screen.

Furthermore, an X-ray diagnostic apparatus and method according to the invention provides for alternatively projecting X-rays toward the object at two different projection angles with respect to the object; producing a first analog video signal from a first X-ray image taken before and after injection of the contrast medium at the first projection angle, and producing a second analog video signal from a second X-ray image taken before and after injection of the contrast medium at the second projection angle; separately producing first and second mask images' analog video signals from the first and second analog video signals obtained before injection of the contrast medium, and separately producing first and second subtraction images' analog video signals by performing a digital subtraction between said first and second mask images' analog video signals and said first and second analog video signals obtained after injection of the contrast medium respectively; and combining the first mask image's analog video signal with the second mask image's analog video signal, and combining the first subtraction image's analog video signal with the second subtraction image's analog video signal, whereby both the first mask image and the second mask image are stereoscopically viewed at the same instant on a TV screen, and both the first subtraction image and the second subtraction image are stereoscopically viewed at the same instant on a TV screen.

BRIEF DESCRIPTION OF THE DRAWINGS

The invention is best understood by reference to the accompanying drawings, of which.

DETAILED DESCRIPTION OF THE PREFERRED EMBODIMENTS

Before proceeding with the preferred embodiments according to the invention, the method of operation of the invention will be described.

In order to realize the stereoscopic X-ray image visualization of the object such as a blood vessel, the object is projected by the X-ray radiation source at two different projection angles with respect to the object before and after injection of the X-ray contrast medium, so that two kinds (= right view and left view) of the "X-ray mask images'" video signals and the "X-ray subtraction images'" video signals from the X-ray contrast image are separately obtained. Then the right-viewed mask image's video signal is combined with the left-viewed one, resulting in one stereoscopic visual picture consisting of the right-viewed image and the left-viewed image on the TV monitor. Similar combination processing is carried out on the subtraction images, so that one can observe stereoscopically the combined subtraction images of the object on the TV monitor.

Now the basic operation of a preferred embodiment will be summarized.

A known stereoscopic X-ray tube of the one target and two focus type is used. The two focuses are alternately switched to obtain a right-viewed X-ray image and a left-viewed X-ray image separately. The X-ray image is then focused on an image intensifier device (referred to "I.I" hereinafter). The X-ray image is converted to an optical X-ray image which is then transmitted to an optical system through a primary lens. The optical image from the primary lens is transmitted to a half mirror which then reflects and transmits the beams of the optical image. Thus, two images each having half of the light amount of the original optical image are obtained and are transmitted to two X-ray TV camera video circuits equipped with pick up tubes (referred to as "TV camera circuit"), respectively. The optical images are converted to analog X-ray television picture signals (video signals) by the respective X-ray TV camera circuits. These analogue X-ray television picture signals are then A/D coverted to digital video signals. These two digital video signals are subject to subtraction processing and are finally synthesized to obtain a composite image, thereby monitoring the right and left views on a single CRT monitor. Thus, a three-dimensional subtraction image can be obtained.

A preferred embodiment of the invention will be described in detail hereinafter.

Figure 1:
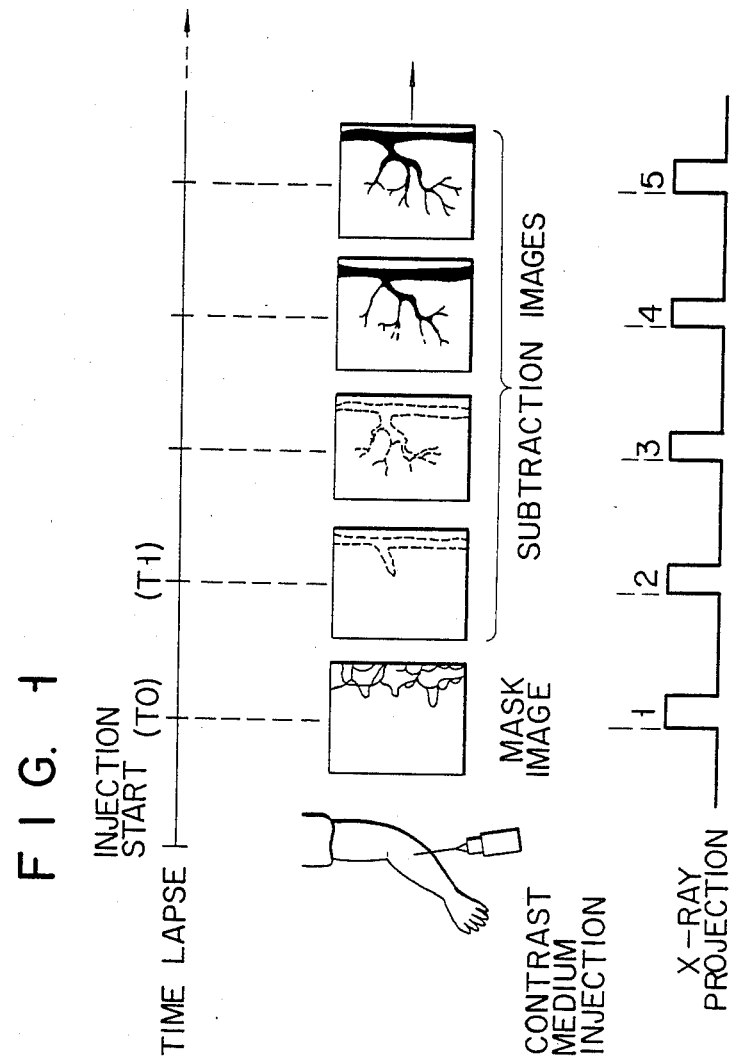
FIG. 1 is an illustration for explaining the principle of operation of the digital subtraction angiography.
Figure 2:
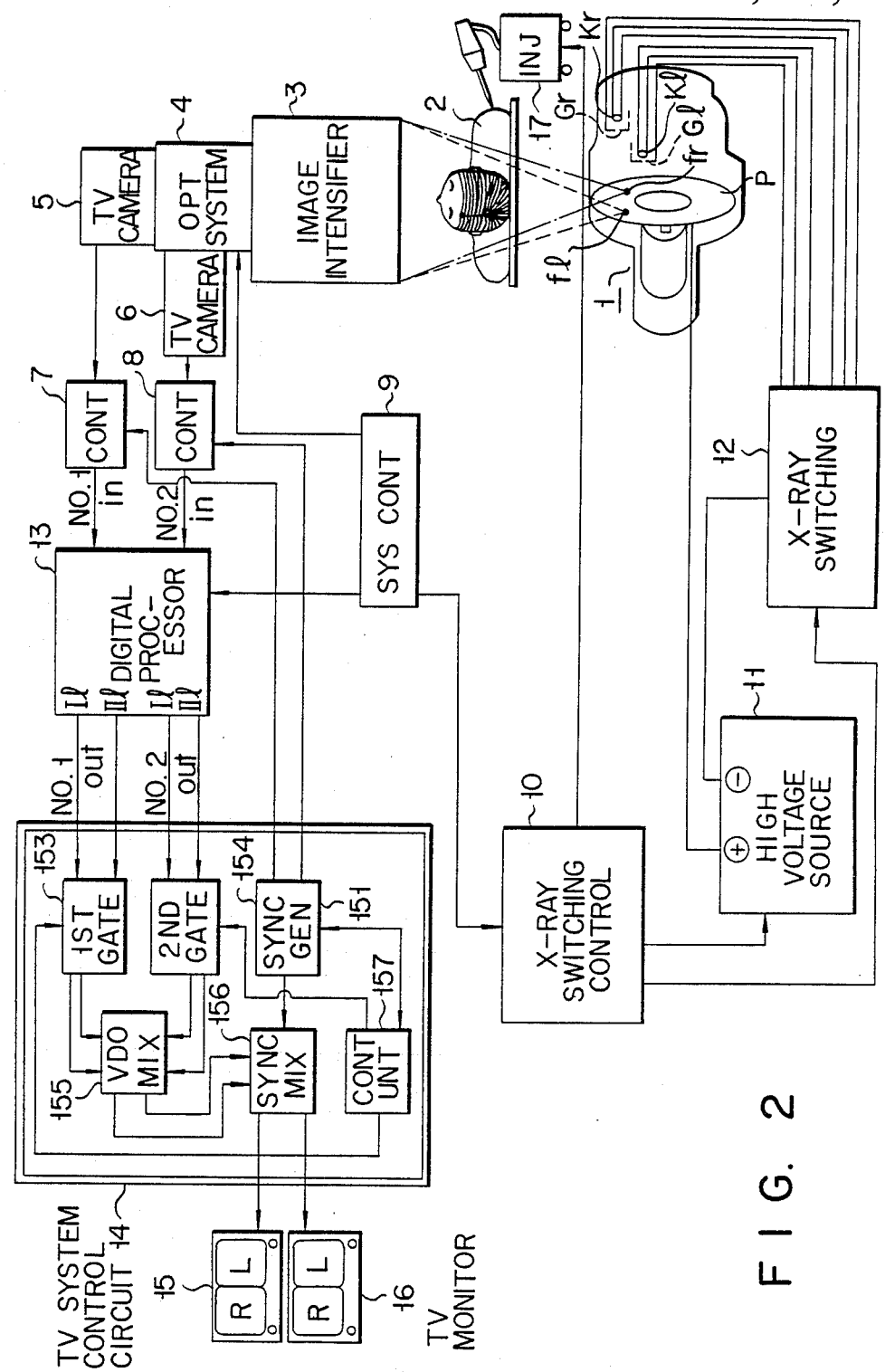
FIG. 2 is a schematic diagram of an X-ray diagnostic apparatus in accordance with the present invention.

As shown in FIG. 2, reference numeral 1 denotes a stereoscopic X-ray tube.

The stereoscopic X-ray tube 1 has a frustoconical rotary anode P. A right cathode Kr and a left cathode Kl are disposed to have an interval corresponding to a distance (i.e., approximately 6.3 cm) between the eyes of an observer so as to oppose the inclined surface portions of the rotating anode P. A right grid Gr and a left grid Gl are disposed between the rotary anode P and the right cathode Kr and between the rotary anode P and the left cathode Kl, respectively. The right and left grids Gr and Gl are alternately biased, so that since the biased grid releases its breaking cut-off operation, thermions are thus alternately emitted from the right and left cathodes Kr and Kl respectively for the right and left views which may correspond to a sight viewed by the right and left eyes of an observer. These thermion beams are alternately bombarded on the opposing inclined surface portions of the rotary anode P to form right and left focuses fr and fl. The X-ray beams are emitted from the right and left focuses fr and fl. Therefore, the X-ray beams are alternately emitted such that the two ranges of the X-ray beams correspond to the views respectively observed by the right and left eyes of a human being.

Reference numeral 2 denotes an object to be examined; 3, an I.I having an input surface to receive an X-ray image obtained by the X-ray beam emitted from the X-ray tube 1 and transmitted through the subject 2. The I.I 3 then converts the X-ray image to an optical image. An optical system 4 comprises a half mirror between primary and secondary lenses (not shown) which constitute a tandem lens system. The optical system 4 is arranged to distribute a fluoresent image from the I.I 3 such that first and second X-ray TV camera circuits 5 and 6, having camera input surfaces perpendicular to each other, receive images each of which has an amount of light half of that of the fluoresent image. The first and second X-ray TV camera circuits 5 and 6 have, respectively, shutters (not shown) at their input sections through which the images from the optical system 4 are transmitted. A predetermined synchronizing relation between the shutters is given: when the fluoresent image corresponds to a left-viewed image, the shutter of the first X-ray TV camera circuit 5 is opened, whereas the shutter of the second X-ray TV camera circuit 6 is closed. However, when the fluoresent image corresponds to a right-viewed image, the shutter of the second X-ray TV camera circuit 6 is opened, whereas the shutter of the first X-ray TV camera circuit 5 is closed. Reference numerals 7 and 8 denote X-ray TV camera control circuits, respectively. The X-ray TV camera control circuits 7 and 8 respectively drive the first and second X-ray TV camera circuits 5 and 6 in accordance with the predetermined synchronizing relation in response to a synchronizing signal from a sync generator 151 in a TV system control circuit 14 to be described later. Reference numeral 9 denotes a system control circuit. The system control circuit 9 controls the overall system of the X-ray diagnostic apparatus. More specifically, the system control circuit 9 performs the following operations: X-ray projection timing control, control of the X-ray tube 1, control of a digital processor 13 to be described later, control of an X-ray contrast medium injection device 17 to be described latter, and control of an auto iris (not shown) disposed in the optical system 4. Reference numeral 10 denotes an X-ray switching control circuit for receiving a command from the system control circuit 9 and for generating an X-ray projection switching control signal for the right or left focus of the X-ray tube 1. Reference numeral 11 denotes a high voltage source device for generating a high voltage for the X-ray tube 1 in accordance with preset tube voltage and current, so that the X-ray tube 1 is operated with the preset tube voltage and current. Reference numeral 12 denotes an X-ray switching circuit for receiving the X-ray projection switching control output from the X-ray control circuit 10 and for controlling the bias voltage of the right and left grids Gr and Gl of the X-ray tube 1 to emit or not to emit the thermion beams to the inclined surface portions of the X-ray tube 1. The digital microprocessor 13 converts the video signals from the first and second X-ray TV camera circuits 5 and 6 to digital signals and performs image processing such as subtraction processing for the respective right- and left-viewed images in accordance with the obtained digital signals. Reference numeral 14 denotes a circuit for extracting and synthesizing the video signals, e.g., a TV system control circuit. The TV system control circuit 14 receives the video signals which are image processed by the digital processor 13 and supplies both video signals for the right- and left-viewed images to a single TV monitor 15 (16) so as to display a three-dimensional subtraction image on the TV monitor 15. Reference numerals 15 and 16 denote TV monitors. The TV monitor 15 displays a mask image and subtraction images (obtained in the Mask mode). The TV monitor 16 displays an instantaneous subtraction image (obtained in the time interval delay TID mode), and images which have been processed in various kinds of desired image processing modes. Reference numeral 17 denotes the X-ray contrast medium injection device. The X-ray contrast medium injection device comprises at least a cylinder used for injecting the contrast medium in the blood vessel of the subject 2 and a drive device for driving the cylinder. In response to the control signal from the X-ray system control circuit 9, the X-ray contrast medium injection device 17 can automatically inject the contrast medium into the object 2.

It should be understood that in this specification, the "mask image" is one which is obtained before the contrast medium penetrates into the examined portion of the patient, e.g. the blood vessel, and on the other hand, the "subtraction image" is one which is obtained such that the mask image's digital video signal is subtracted from each contrast image's digital video signal after penetration of the contrast medium, or the former subtracted digital video signal is subtracted from the latter one.

The operation and configuration of the main part of the X-ray diagnostic apparatus of the preferred embodiment described above will now be described in more detail.

Figure 3:
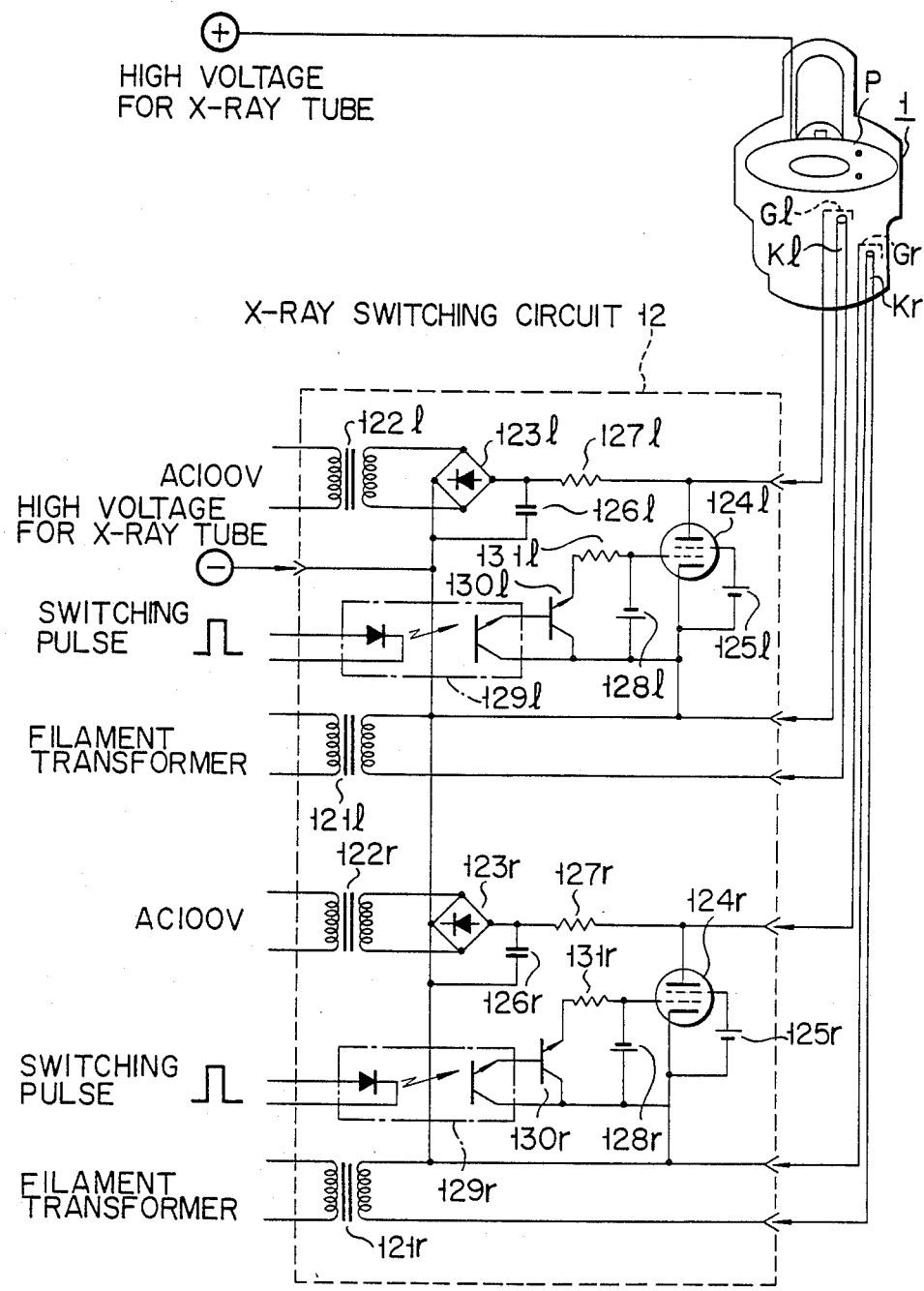
FIG. 3 is a schematic circuit diagram of the X-ray switching control circuit used in FIG. 2.

FIG. 3 is a schematic circuit diagram of the X-ray switching control circuit 12 used in FIG. 2. As shown in FIG. 2, reference numeral 1 denotes the X-ray tube as previously mentioned. Reference symbols and ⊕ and ⊖ denote positive and negative high voltage outputs from the X-ray high voltage source device 11, respectively.

The X-ray switching circuit 12 is suitable for the two-focus type stereoscopic X-ray tube 1. Since the X-ray tube 1 has right and left cathodes, the X-ray switching circuit 12 has control sections respectively for the right and left cathodes.

These control sections of the X-ray switching circuit 12 have the same arrangement. Only one of the control sections is described, whereas the other one is only illustrated for the sake of simplicity.

The arrangement for producing the right-viewed image is suffixed by r and the arrangement for producing the left-viewed image is suffixed by l in the above description. However, such suffixes are merely omitted in the following description.

Referring to FIG. 3, reference numeral 121 denotes a filament transformer. The filament transformer 121 receives the output from the high voltage source device 11 and generates a voltage corresponding to the input level thereof. This voltage is applied across the corresponding cathode of the X-ray tube 1. Reference numeral 122 denotes a transformer for generating a grid bias voltage of the X-ray tube 1. The transformer 122 receives a commercial 100-V main voltage and transforms this voltage into the desired higher voltage. Reference numeral 123 denotes a rectifier for performing full-wave rectification to produce a negative DC voltage. Reference numeral 124 denotes a tetrode for controlling X-ray projection switching of the X-ray tube 1. The cathode of the tetrode 124 is connected between the corresponding grid and cathode of the X-ray tube 1. Reference numeral 125 denotes a second grid bias power source connected to the cathode-second grid path of the tetrode 124. The bias power source 125 sets the second grid of the tetrode 124 at a positive potential so as to properly set the internal resistance of the tetrode 124. Reference numeral 126 denotes a capacitor connected to the output ends of the rectifier 123. Reference numeral 127 denotes a resistor connected between the rectifier 123 and the corresponding grid of the X-ray tube 1. Reference numeral 128 denotes a first grid bias power source connected between the cathode and the first grid of the tetrode 124. The first grid bias power source 128 biases the first grid to be negative.

Reference numeral 129 denotes a photocoupler 129 responsive to the X-ray projection switching control pulse from the X-ray switching control circuit 10. Reference numeral 130 denotes a switching transistor responsive to the output from the photocoupler 129. The emitter of the switching transistor 130 is connected to the negative terminal of the first grid bias power source 128 through a resistor 131, and the collector thereof is connected to the positive terminal of the first grid bias power source 128.

The operation of the X-ray switching circuit 12 having the above-mentioned arrangement will be described hereinafter.

A high voltage output from the high voltage source device 11 is applied to the cathode-anode path of the X-ray tube 1. This high voltage output is also applied as a filament heating voltage to the cathode of the X-ray tube 1 through the filament transformer 121.

Meanwhile, an output from the transformer 122 is rectified by the rectifier 123, and a negative rectified output is then applied to the grid of the X-ray tube through the resistor 127. The positive rectified output is applied to the cathode of the X-ray tube 1. Therefore, the corresponding grid-cathode path of the X-ray tube 1 is reverse-biased by the output voltage from the rectifier 123. As a result, the X-ray tube 1 is kept cut off.

The voltage appearing across the output terminals of the rectifier 123 is applied to the tetrode 124. However, the path between the first grid and the cathode of the tetrode 124 is reverse-biased by the first grid bias power source 128. Therefore, in the normal condition, the tetrode 124 is kept cut off.

When an X-ray projection switching control pulse is supplied from the X-ray switching control circuit 10 to the photocoupler 129, the transistor 130 is turned on in response to the output from the photocoupler 129. The output current from the first grid bias power source 128 flows in a closed loop formed by the transistor 130 and the resistor 131, thus resulting in a voltage drop. This voltage drop allows the release of the reverse bias of the first grid, so that the tetrode 124 is turned on. Therefore, the output from the rectifier 123 flows in the closed loop formed by the resistor 127 and the tetrode 124, resulting in a voltage drop across the resistor 127. This voltage drop allows the release of the reverse bias applied to the grid of the X-ray tube 1. As a result, thermion beams are emitted from the cathode to which this forward-biased grid corresponds and are bombarded on the anode.

The X-ray tube 1 thus irradiates the X-ray beam.

When the X-ray projection switching control pulse disappears, the photocoupler 129 is turned off, and the transistor 130 is then turned off. The first grid of the tetrode 124 is reverse-biased again, so that the tetrode 124 is cut off. Subsequently, the grid of the X-ray tube 1 is also reverse-biased, so that the X-ray tube 1 is cut off. The X-ray beam is no longer irradiated from the X-ray tube 1.

The X-ray projection switching control pulse is used to selectively turn on/off the right and left photocouplers 129r and 129l, so that the X-ray projections for producing the right-viewed image or the left-viewed image can be controlled.

The digital processor 13 shown in FIG. 4 will be described in detail.

The digital processor 13 is an image processing unit which is the center of digital radiography.

Figure 4:
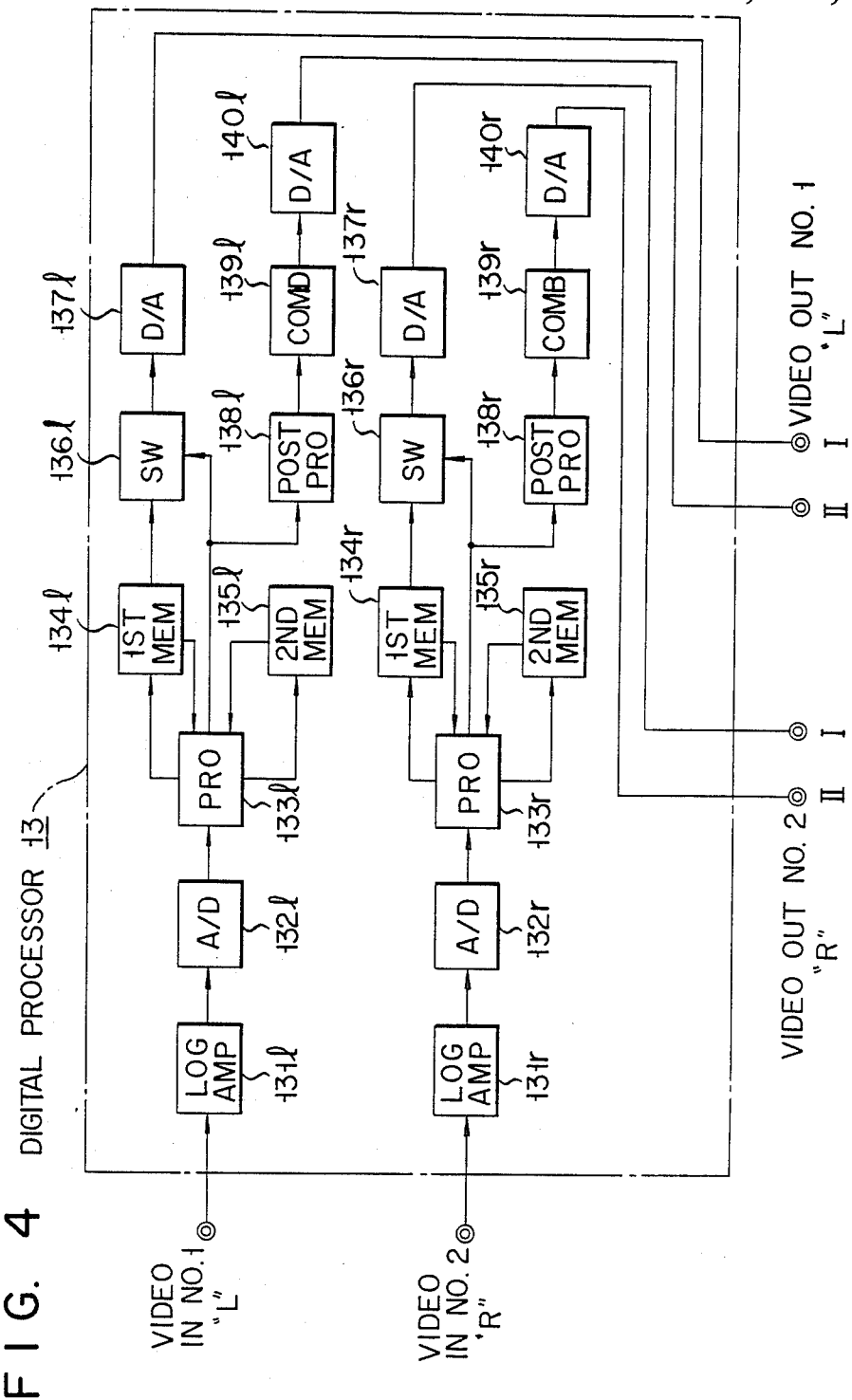
FIG. 4 is a schematic diagram of the digital processor used in FIG. 2.

Referring to FIG. 4, the digital processor 13 has one section for the right-viewed image which is suffixed by r and the other section for the left-viewed image which is suffixed by l. Since these sections have the same arrangement, only one of the sections is described, whereas the other is only illustrated for the sake of simplicity. Furthermore, the arrangement for producing the right-viewed image is suffixed by r and the arrangement for producing the left-viewed image is suffixed by l as previously described. However, such suffixes are omitted in the following description.

Referring to FIG. 4, reference numeral 131 denotes a logarithmic amplifier (log amp); 132, an A/D converter; and 133, a processor using a given algorithm for executing subtraction processing of two input images. Reference numeral 134 denotes a first digital memory for storing mask images; 135, a second digital memory for sequentially storing subtraction images obtained by the subtraction processing executed between the mask image and subsequently obtained images; 136, a switch for selecting one of the mask image and the subtraction image so as to display a selected image on the display; and 137, a D/A converter. Reference numeral 138 denotes a post processor for emphasizing the stored subtraction image; 139, an image combining circuit for combining the subtraction images which have been emphasized; and 140, a D/A converter for producing an analog subtraction video signal. The digital processor having the above arrangement uses a subtraction processing system which is synchronized with the interrupted X-ray projection of one image/second or two images/second. The digital processor operates as follows. The X-ray television picture signal (video signal which corresponds to the mask image) obtained before the contrast medium penetrates or is injected into the object to be examined, is converted by the logarithmic amplifier 131 and the A/D converter 132 to a digital signal. This digital signal is then stored in the first digital memory 134. The X-ray television picture signal (video signal) obtained after the contrast medium penetrates or is injected into the object to be examined, is converted by the A/D converter 132 to a digital signal. The mask image's digital video signal is subtracted by the processor 133 from the digital video signal after penetration of the contrast medium to obtain a digital subtraction image. A resultant digital subtraction image is then stored in the second digital memory 135. In response to the switching operation of the switch 136, the analog video signal corresponding to the mask image or the subtraction image is read out and supplied to the TV system control circuit 14 (shown in FIG. 2).

The TV system control circuit 14 shown in FIG. 2 will be described in detail.

The TV system control circuit 14 comprises a first gate 153, a second gate 154, a video mixer 155, a sync generator 151, a sync signal mixer 156 and a control unit 157. The first gate 153 selects one of an analog video signal Il (which corresponds to the left-viewed mask image) from the digital processor 13 and an analog video signal IIl (which corresponds to the left-viewed subtraction image) therefrom and provides the selected signal. The second gate 154 selects one of an analog video signal Ir (which corresponds to the right-viewed mask image) from the digital processor 13 and an analog video signal IIr (which corresponds to the right-viewed subtraction image) therefrom and passes the selected signal. The video mixer 155 mixes the analog video signals Ir and Il or the analog video signals IIr and IIl. The sync generator 151 generates a synchronizing signal. The sync mixer 156 superimposes the synchronizing signal from the sync generator 151 on a combined analog video signal from the video mixer 155. The sync mixer 156 produces a superimposed TV picture signal to the TV monitors 15 and 16. The control unit 157 controls the timings of the first gate 153, the second gate 154 and the sync generator 151. In this manner, the TV system control circuit 14 has the arrangement described above, so that the right-viewed image and the left-viewed image can be simultaneously displayed on the TV monitors, respectively, thereby providing stereoscopic visualization of the object to be examined. The subtraction image can be observed on the TV monitor 15 or 16 in a three-dimensional manner. Therefore, unlike the conventional apparatus, X-ray projections with a plurality of injections of the contrast medium to obtain a plurality of two-dimensional images need not be performed. As a result, the diagnostic apparatus of the invention has an advantage in diagnostic X-ray studies of patients.

Now the overall operation of the above-mentioned embodiment will be explained in more detail.

Figure 5:
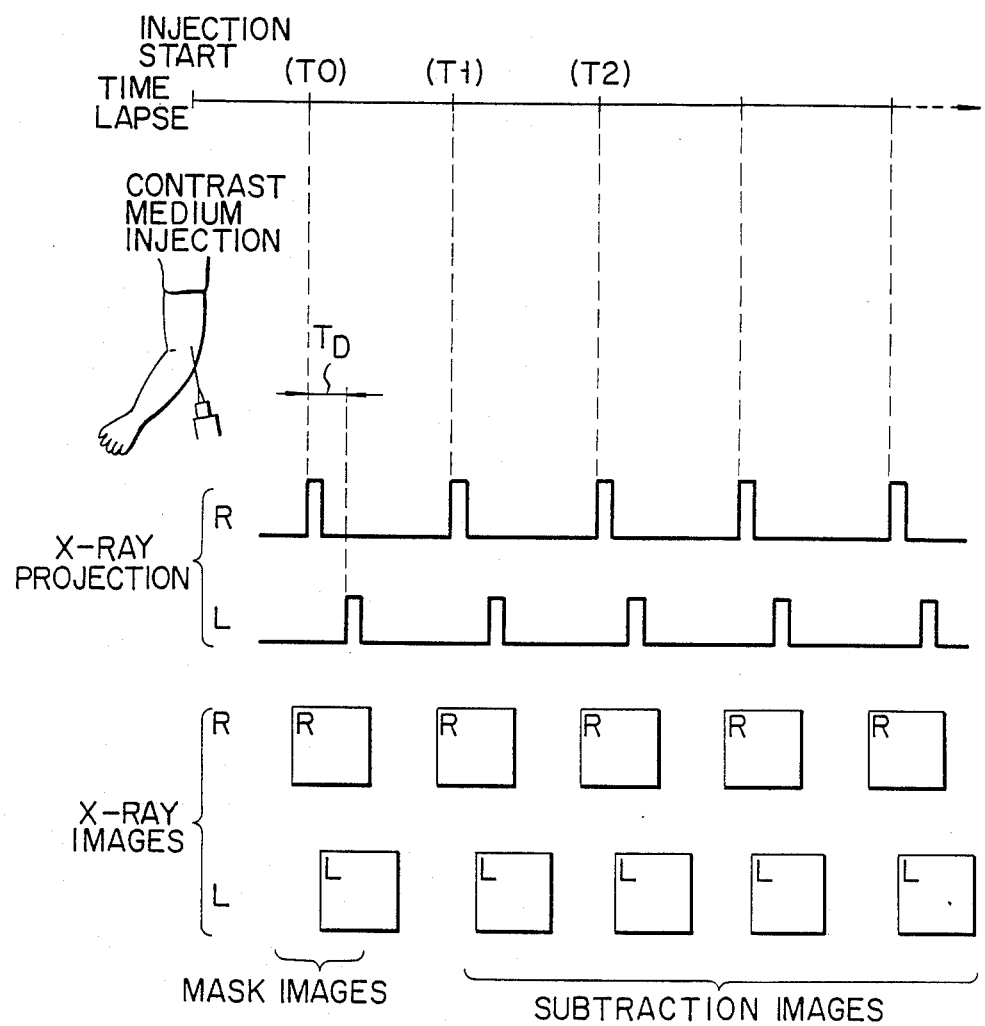
FIG. 5 is an illustration for explaining the sequential operation of the apparatus shown in FIG. 2.

The patient is laid on a couch for X-ray projection. The X-ray projection program which includes the X-ray projection conditions, delay times, X-ray projection intervals (images/second), total time of X-ray projections in seconds and the like, is preset on a console deck (not shown). When the system control circuit 9 is set up, the operator depresses a start button (not shown) on the console deck. As shown in FIG. 5, when the time interval T0 has elapsed after the contrast medium is automatically injected by the X-ray contrast medium injection device 17 into the object 2 to be examined, the X-ray beams are interruptedly or intermittently irradiated from the X-ray tube 1.

The left cathode Kl and then the right cathode Kr of the X-ray tube 1 are operated with delay time T1 under the control of the X-ray switching circuit 12. The thermion beams are alternately emitted from the right and left cathodes Kr and Kl such that the right cathode Kr and then the left cathode Kl are operated so as to have a delay time interval TD therebetween, thereby projecting the right and left-viewed X-ray beams from the X-ray tube 1 alternately toward the object 2 to be examined.

The right-viewed X-ray image obtained by the first right X-ray projection is converted to the fluorescent image by the I.I 3. This fluorescent image is converted to the right-viewed video signal by the second X-ray TV camera circuit 6 through the optical system 4, as shown in FIG. 6A. The right-viewed video signal is A/D converted in the digital processor 13. The digital right-viewed video signal is then stored in the first digital memory 134. When the right-viewed fluorescent image is transmitted onto the second X-ray TV camera circuit 6, the shutter (not shown) of the first X-ray TV camera circuit 5 is closed, so that the right-viewed fluorescent image may not be transmitted to the first X-ray TV camera circuit 5. The left-viewed X-ray image obtained by the first left X-ray projection can be stored as the digital left-viewed video image in the first digital memory of the digital processor 13 through the first X-ray TV camera circuit 5, in the same manner as in the right-viewed X-ray image. As a result, the mask image is obtained by the first right- and left-viewed X-ray projection, as previously explained.

Figure 6:
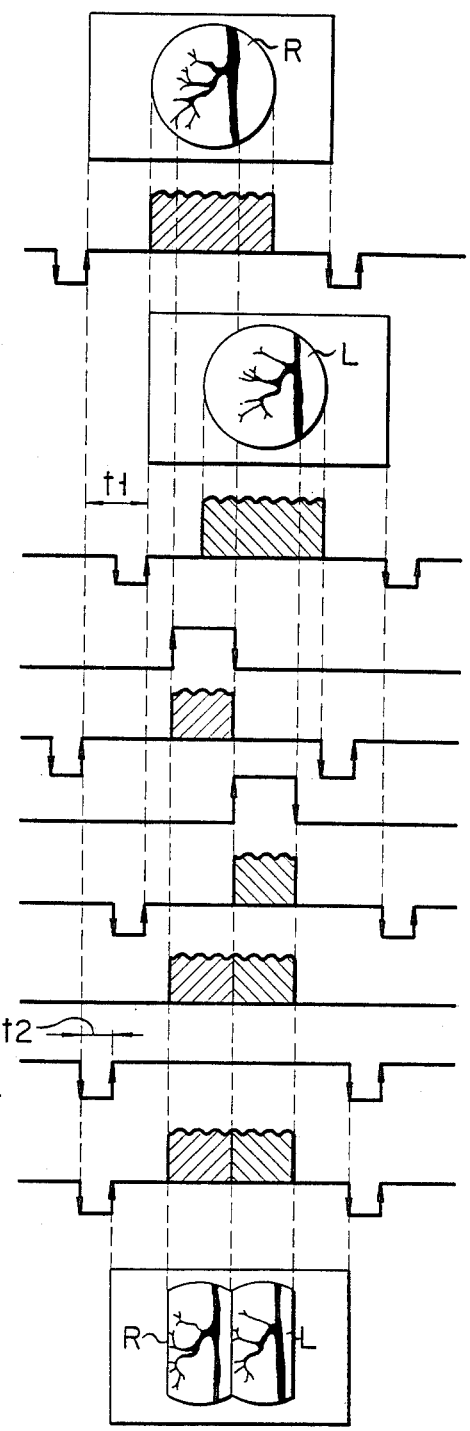
FIGS. 6A to 6L show schematically the waveforms of the TV camera video signal and the combined video signals.

Now the detailed explanation of FIG. 6 will be described.

FIGS. 6A and FIG. 6C each shows the right-viewed and the left-viewed pictures (image) taken through the image intensifier 3 and the TV camera circuits 5 and 6, which is imaginarily surrounded by the frame of TV monitor 15 or 16 respectively. Since the region defined by the TV monitor frame, except the picture region (= circle region), contains no diagnostic information, no video signal component exits in the TV camera output signal (see FIGS. 6B and 6D). FIGS. 6B and 6D each shows the TV video output signal having the synchronizing signals for the right-viewed and the left-viewed pictures respectively when scanning the center of the circular picture region. This video output signal contains diagnostic information of the object to be examined. As previously stated, first the right-viewed picture is taken by the TV camera circuit 5 and after a given time interval "tl" has passed, the left-viewed picture is taken by the TV camera circuit 6, so that there is the time interval "tl" between the right-viewed output signal and the left-viewed one (see FIGS. 6B and 6D). In general, the desired region (image) for diagnostic purpose is located in the vicinity of the center area of the viewed overall picture. Therefore the video signal portion e.g. FIG. 6B, which is desired to be displayed on the TV monitor, can be derived by adjusting the duration of the gating pulse of e.g. the second gate 154 under control of the control unit 157 (see FIGS. E, F, G and H). The video signal combining the right- and left-viewed signal portions is processed by superimposing a new synchronizing signal derived from the sync generator 151, of which period "t2" is identical to that used in the TV camera circuits 5 and 6, or is selected to fit the TV monitors 15 and 16 (See FIGS. 6I, 6J and 6K).

For the sake of simplicity, in this figure the synchronizing timing of the combined TV picture signal is coincident with that of the right-viewed video signal (see FIGS. 6B and 6K). As a result, the combined picture portions for the right and left views can be simultaneously displayed on the TV monitor 15 or 16 (see FIG. 6L).

As shown in FIG. 5, second and subsequent X-ray projections for right- and left-viewed images are alternately performed after time T2. The digital video signals for the right- and left-viewed X-ray images, which indicate the different penetration states of the contrast medium in the portion to be examined, are then sequentially stored in the first digital memory 134 of the digital processor 13. The mask image's digital video signal is then subtracted from the obtained digital video signal indicating the right- or left-viewed X-ray image, by the algorithmic processor 133, thus obtaining a subtraction image which is temporarily stored in the second digital memory 135. Upon switching of the switching circuit 136, the analog video signals Ir and Il of the right- and left-viewed mask images and the analog video signals IIr and IIl for the right- and left-viewed subtraction images are supplied to the TV system-control circuit 14.

In the TV system controller 14, the first gate 153 selects the analog video signals Il and IIl for the left-viewed images (see FIGS. 6B, 6G and 6H), while the second gate 154 selects the analog video signals Ir and IIr for the right-viewed images (FIGS. 6D, 6E and 6F). The video mixer 155 mixes the analog video signals Ir and IIr and the analog video signals Il and IIl, as shown in FIG. 6I. The sync mixer 156 superimposes new synchronizing signals on the combined analog video signal. The composite signal is thus supplied to the TV monitors 15 and 16. Each of the TV monitors 15 and 16 simultaneously displays the right- and left-viewed images, as shown in FIG. 6L. The TV monitor 15 displays, for example, the mask image or the subtraction image obtained in the mask mode, whereas the TV monitor 16 displays, for example, the subtraction image obtained in the time interval difference mode.

In accordance with the preferred embodiment, the two-focus and one-target stereoscopic X-ray tube is used together with the two X-ray TV camera circuits so as to perform the subtraction for the digital video signals from the X-ray TV cameras and the synthesis of the right- and left-viewed video signals. Therefore, a stereoscopic X-ray picture, i.e., the mask image or the subtraction image, can be displayed on the TV monitor. Therefore, contrary to the conventional apparatus, the contrast medium need not be repeatedly injected into the object (patient), thereby greatly decreasing a patient's risk, or damage caused by frequent injection of the contrast medium. Furthermore, stereoscopic visualization can be performed on the TV monitor, thus allowing the doctor to properly investigate the X-ray picture and hence to achieve the proper diagnosis.

While the invention has been described in terms of certain preferred embodiments, and exemplified with respect thereto, those of skill in the art will readily appreciate that various modifications, changes, omissions, and substitutions may be made without departing from the spirit of the invention.

In the above embodiment, the digital video signal which is subtraction-processed is stored in the second digital memory 135 of the digital processor 13. However, such data may be recorded in an external memory such as a video disk recorder or a video tape recorder.

Furthermore, in the above embodiment, the one-target and two-focus X-ray tube is used. However, the invention is not limited to the use of such an X-ray tube. A conventional one-target and one-focus X-ray tube may be used and pivoted by a predetermined angular distance with respect to the object to be examined to obtain the same stereoscopic effect as the embodiment described above.

What is claimed is:

1. A method for obtaining, on a TV monitor, a stereoscopic X-ray angiographic image of an object under X-ray examination where a contrast medium is injected into said object, comprising the steps of:
   alternately projecting X-rays toward said object at first and second projection angles;
   producing a first X-ray image of said object taken from said first angle before said contrast medium has been injected;
   producing a second X-ray image of said object taken from said first angle after said contrast image has been injected;
   producing a third X-ray image of said object taken from said second angle before said contrast medium has been injected;
   producing a fourth X-ray image of said object taken from said second angle after said contrast medium has been injected;
   generating first, second, third, and fourth analog video signals from said first, second, third, and fourth X-ray images, respectively;
   producing a first subtraction image by performing a first digital subtraction between said first and second analog video signals;
   producing a second subtraction image by performing a second digital subtraction between said third and fourth analog signals; and
   combining said first and said second subtraction images within one frame period of said TV, whereby both said subtraction images are displayed on said TV monitor at the same instant so that a stereoscopic view of said object is displayed.

2. A method for obtaining, on a TV monitor, a stereoscopic X-ray angiographic image of an object under X-ray examination where a contrast medium is injected into said object and penetrates to an area of interest in said object, comprising the steps of:
   alternately projecting X-rays toward said object at first and second projection angles;
   producing a plurality of first X-ray images of said object taken from said first angle during penetration of said contrast medium into said area of interest;
   producing a plurality of second X-ray images of said object taken from said second angle during penetration of said contrast medium into said area of interest;
   generating a plurality of first and second analog video signals from said first and second X-ray images, respectively;
   producing a first subtraction image by performing a first digital subtraction among said plurality of first analog video signals;
   producing a second subtraction image by performing a second digital subtraction among said plurality of second analog video signals; and
   combining said first and said second subtraction images within one frame period of said TV, hereby both of said subtraction images are displayed on said TV monitor at the same instant so that a stereoscopic view of said object is displayed.

3. Apparatus for obtaining, on a TV monitor, a stereoscopic X-ray angiograhic image of an object under X-ray examination where a contrast medium is injected into said object, comprising:
   means for alternately projecting X-rays toward said object at first and second projection angles;
   means for (a) producing a first X-ray image of said object taken from said first angle before said contrast medium has been injected, (b) producing a second X-ray image of said object taken from said first angle after said contrast image has been injected, (c) producing a third X-ray image of said object taken from said second angle before said contrast medium has been injected, (d) producing a fourth X-ray image of said object taken from said second angle after said contrast medium has been injected, (e) generating first, second, third, and fourth analog video signals from said first, second, third, and fourth X-ray images, respectively;
   means for separately producing (a) a first subtraction image by performing a first digital subtraction between said first and second analog video signals, and (b) a second subtraction image by performing a second digital subtraction between said third and fourth analog signals; and
   means for combining said first and said second subtraction images within one frame period of said TV, whereby both said subtraction images are displayed on said TV monitor at the same instant so that a stereoscopic view of said object is displayed.

4. An apparatus as claimed in claim 3, wherein:
   said X-ray projecting means includes a one-target and two-focus stereoscopic X-ray tube for alternately projecting X-rays toward said object at two different projection angles with respect to said object;
   said means for producing and generating includes:
      an image intensifier device to receive X-ray images taken at said two different projection angles; and
      first and second TV camera video circuits equipped with pick up tubes to receive said X-ray images from said image intensifier device and to produce said first, second, third, and fourth analog video signals corresponding to said first, second, third and fourth X-ray images, respectively;
   said means for seperately producing said first and second subtraction images includes:
      first and second A/D converters for converting analog video signals obtained before and after injection of the contrast medium into first and second digital video signals respectively;

first and second digital memory means for storing said first and second digital video signals obtained before injection of the contrast medium as first and second mask images' digital video signals respectively;

third and fourth digital memory means for storing first and second digital video signals obtained after injection of the contrast medium respectively;

processing means for performing the digital subtraction between said first and second mask images' digital video signals and said first and second digital video signals stored in said third and fourth digital memory means so as to produce first and second subtraction images' digital video signals; and first and second D/A converters for converting said first and second subtraction images' digital video signals into first and second subtraction images video signals; and said means for combining includes;

first and second gate circuits for gating said first and second subtraction images analog video signals during a predetermined period so as to leave necessary diagnostic information of said object on said first and second subtraction images analog video signals, respectively; and a video mixer for mixing the gated first subtraction image analog video signal with the gated second subtraction analog video signal.

5. Apparatus for obtaining, on a TV monitor, a stereoscopic X-ray angiographic image of an object under X-ray examination where a contrast medium is injected into said object and penetrates to an area of interest in said object, comprising:

means for alternately projecting X-rays toward said object at first and second projection angles;

means for (a) producing a plurality of first X-ray images of said object taken from said first angle during penetration of said contrast medium into said area of interest, (b) producing a plurality of second X-ray images of said object taken from said second angle during penetration of said contrast medium into said area of interest, and (c) generating a plurality of first and second analog video signals from said first and second X-ray images respectively;

means for seperately producing (a) a first subtraction image by performing a first digital subtraction among said plurality of first analog video signals, and (b) a second subtraction image by performing a second digital subtraction among said plurality of second analog video signals; and means for combining said first and said second subtraction images within one frame period of said TV, whereby both of said subtraction images are displayed on said TV monitor at the same instant so that a stereoscopic view of said object is displayed.

6. An X-ray diagnostic apparatus as claimed in claim 5 wherein:

said X-ray projecting means includes a one-target and two-focus stereoscopic X-ray tube for alternately projecting X-rays toward said object at two different projection angles with respect to said object;

said means for producing and generating includes:

an image intensifier device to receive X-ray images taken at said two different projection angles;

first and second TV camera video circuits equipped with pick up tubes to receive said X-ray images from said image intensifier device and to produce said plurality of first and second analog video signals corresponding to said plurality of first and second X-ray images, respectively;

said means for separately producing said first and second subtraction images includes:

first and second A/D converters for converting analog video signals obtained before and after injection of said contrast medium into first and second digital video signals respectively, first and second digital memory means for storing said first and second digital video signals obtained before injection of the contrast medium as first and second mask images' digital video signals, respectively, third and fourth digital memory means for storing said first and second digital video signals obtained after injection of said contrast medium, processing means for performing the digital subtraction between said first and second mask images' digital video signals and said first and second digital video signals stored in said third and fourth digital memory means so as to produce separately first and second subtraction images' digital video signals, first and second D/A converters for converting first and second mask images' digital video signals into first and second mask images' analog video signals, respectively; and third and fourth D/A converters for converting said first and second subtraction images' digital video signals into first and second subtraction images' analog video signals respectively; and said means for combining includes:

first and second gate circuits for gating said first and second mask images' analog video signals during a predetermined period so as to leave necessary diagnostic information from the examined object on said first and second mask images' analog video signals respectively, and for gating said first and second subtraction images' analog video signals during a predetermined period so as to leave necessary diagnostic information from the examined object on said first and second subtraction images' analog video signals respectively; and a video mixer for mixing said gated first mask image's analog video signal with said gated second mask image's analog video signal and for mixing said gated first subtraction image's analog video signal with said gated second subtraction image's analog video signal.

7. Apparatus for obtaining, on a TV monitor, a stereoscopic X-ray angiographic image of an object under X-ray examination where a contrast medium is injected into said object and penetrates to an area of interest in said object, comprising:

means for alternately projecting X-rays toward said object at first and second projecting angles;

means for (a) producing a first X-ray image of said object taken from said first angle before said contrast medium is injected, (b) producing a second X-ray image of said object taken from said second angle before said contrast medium is injected, (c) producing a plurality of third X-ray images of said object taken from said first angle during penetration of said contrast medium into said area of interest, (d) producing a plurality of fourth X-ray images of said object taken from said second angle during penetration of said contrast medium into said area of interest, (e) generating first and second analog video signals from said first and second X-ray images, respectively, (f) generating a plurality of third and fourth analog video signals from said plurality of third and fourth X-ray images, respectively;

means for separately producing (a) a first subtraction image by performing a first digital subtraction between said first analog video signal and one of said plurality of third analog video signals, (b) a second subtraction image by performing a second digital subtraction between said second analog video signal and one of said plurality of fourth analog video signals, (c) a plurality of third subtraction images by performing a plurality of third digital subtractions among selected ones of said plurality of third analog video signals, (d) a plurality of fourth subtraction images by performing a plurality of fourth digital subtractions among selected ones of said plurality of fourth analog video signals;

means for (a) combining said first and second subtraction images within a first TV frame period whereby both said first and second subtraction images are displayed on said TV monitor at the same instant, (b) pairing selected ones of said plurality of third subtraction images with selected ones of said plurality of fourth subtraction images within at least second and third TV frame periods, respectively, whereby selected pairs of said plurality of third and fourth subtraction images are being displayed on said TV monitor at the same instant so that a stereoscopic view of said object is displayed.

* * * * *